May 13, 1958 E. A. CARLSON 2,834,549
AUTOMOTIVE HEATER
Filed Sept. 24, 1953
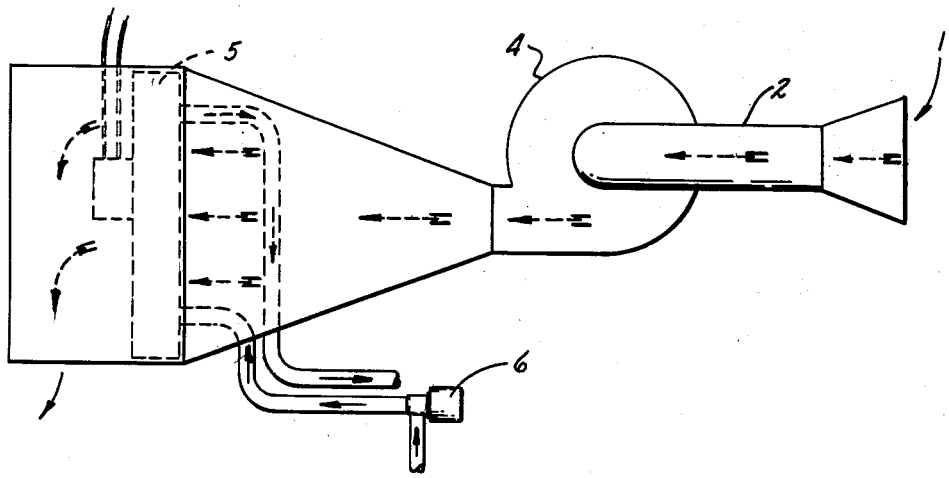
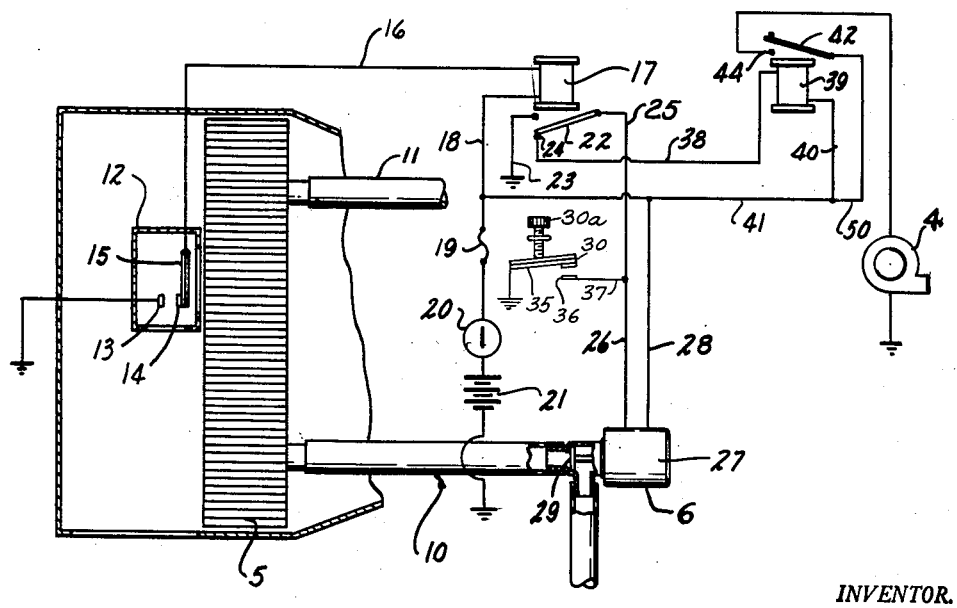
INVENTOR.
ELMER A. CARLSON
BY
*Harry C. Riley*
ATTORNEY

2,834,549

AUTOMOTIVE HEATER

Elmer A. Carlson, Detroit, Mich., assignor to Essex Wire Corporation

Application September 24, 1953, Serial No. 382,136

2 Claims. (Cl. 236—37)

This invention relates to fresh air automotive heaters and in particular to a fully automatic fresh air heater.

Fresh air automotive heaters previously available required that the operator of the vehicle adjust several controls to attain a desired passenger compartment temperature. In addition, it was necessary for the operator to make compensatory adjustments for variations in driving conditions.

The object of this invention is to provide a fully automatic heater that will perform uniformly over a wide range of driving conditions. The invention reduces the operation of a fresh air heater to the selection of a desired passenger compartment temperature. The fully automatic controls thereafter maintain selected temperatures eliminating all of the operations and adjustments previously required for passenger comfort. The fully automatic heater provided requires no attention from the driver, summer or winter, other than a manual adjustment coincident with the clothing worn.

Other objects of the invention will be apparent to those skilled in the art after consideration of the following detailed description and accompanying drawings wherein:

Fig. 1 is a schematic side elevation of fresh air heater.

Fig. 2 is a schematic wiring diagram of the invention partially in section.

Referring now to the drawings:

Fig. 1 schematically illustrates the general features of a fresh air type heater. The flared end 1 is an air scoop located at the front of the vehicle. During forward motion of the vehicle, air is forced into the air passageway 2 through the cored heat exchanger 5 and into the passenger compartment of the vehicle. The heating of the passenger compartment is dependent upon the volume and temperature of air passing through the heat exchanger and into the compartment. In the event that the ram air is insufficient to produce the required flow of ram air, the fan 4 is used to force air through the heat exchanger. The source of heat energy is ordinarily, although not necessarily, the liquid coolant for the engine of the vehicle. In general, the coolant is water and it is ordinarily at a temperature of from 150° to 170°. The water is piped to and from the heat exchanger in a re-circulatory manner and is controlled by the water valve 6.

It is to be noted that this invention is particularly applicable to fresh air type heaters. It is also possible, however, to use a re-circulatory type of system wherein air from the inside of the vehicle is delivered to the heat exchanger rather than outside air.

Fig. 2 illustrates in detail the operation of applicant's invention. By way of general explanation of the invention, an automatic plenum thermostat is used to maintain the heat exchanger at a given temperature level. As a result, the ram air passing through the heat exchanger is at a given minimum temperature. A second manually adjusted thermostat forces more air through the heat exchanger, while automatically increasing the temperature of the heat exchanger, thereby increasing the temperature of the passenger compartment from the minimum heat exchanger output temperature demanded by the plenum thermostat to that temperature demanded by the manually set thermostat. In addition, the plenum thermostat operates to increase the temperature of air normally admitted to the passenger compartment of the vehicle as the temperature of the outside air drops. Provision is also made to prevent the blower from operating except when the heat exchanger is at or above the minimum temperature demanded by the plenum thermostat. Thus, when the heater is cold as when first starting the vehicle, cold air is not blown into the passenger compartment chilling the occupants.

The heat exchanger is illustrated in Fig. 2 at 5. Hot water is admitted to the core through inlet pipe 10 and recirculated to the vehicle engine through outlet pipe 11. The water valve 6 controls the flow of hot water to the core. The plenum thermostat 12 is located adjacent the exhaust side of the core 5. This thermostat is calibrated to open at a given temperature. Applicant has found that a thermostat which is calibrated to open at 80° F. is generally satisfactory. The thermostat can be located at any point where the maintenance of an 80° F. temperature will give the desired temperature of air entering the vehicle from the heat exchanger. The distinction between the temperature of the plenum thermostat and the temperature of air entering the compartment is due to a gradient of air temperature across the exhaust face of the cored heater. For example, water enters the core at a temperature of approximately 160° F. The water is cooled as it passes through the heat exchanger and leaves the heat exchanger at a temperature considerably cooler than the entering temperature. There is a corresponding gradient in the resultant air passing through the heat exchanger. Air passing through the core in the vicinity of the outlet will be relatively cool as compared to air passing through the core in the vicinity of the inlet. The plenum thermostat, therefore, may be strategically located to increase the temperature of air admitted to the compartment as the outside air temperature falls. For example, if the thermostat is located adjacent the cooler side of the core, the inlet portion of the core is necessarily made hotter to maintain the air at the location of the plenum thermostat at a given temperature as outside temperature falls. This is exemplified by the following chart of air temperatures. The first column indicates outside air temperature. The second column indicates the constancy of air temperature in the vicinity of the plenum thermostat which is located adjacent the cool side of the heat exchanger. The third column indicates the resultant air temperature adjacent the hot side of the core resulting from maintaining the plenum ambient at 80°. Column four indicates the temperature of the admixed air actually delivered to the passenger compartment.

| Outside Air Temperature | Plenum Ambient | Hot Side of Core | Air Mixture Delivered to Compartment |
|---|---|---|---|
| 80 | 80 | 80 | 80 |
| 70 | 80 | 90 | 85 |
| 60 | 80 | 100 | 90 |
| 40 | 80 | 120 | 100 |
| 20 | 80 | 140 | 110 |

Comparison of column 4 with column 1 indicates how the temperature of the air delivered to the passenger compartment varies inversely with outside temperature. The increased temperature of air wrought by action of the plenum thermostat corresponds to a greater B. t. u. requirement for maintaining inside temperatures in the face of falling outside temperatures.

The operation of the device is as follows:

As the air directed to the plenum falls below 80° F., the grounded contact 13 and contact 14 are closed due to the action of the bi-metal 15. A circuit is thereby closed from ground through contacts 13 and 14, bi-metal 15, lead 16, relay coil 17, lead 18, fuse 19, ignition switch 20, and battery 21 to ground. Energization of relay coil 17 pulls in armature 22. A circuit is thereby closed from ground through contact 23, armature 22, lead 25, lead 26, valve coil 27, lead 28, fuse 19, to power source 21 and ground. Energization of valve coil 27 pulls in armature or, water valve, 29. Thus, when the air temperature directed to the plenum falls below 80° F., the plenum thermostat closes and hot water flows into the core 5. Conversely, when the temperature of the air directed to the plenum thermostat is above 80° F., contacts 13 and 14 are open and the flow of hot water to the core is interrupted. Thus, the plenum thermostat automatically maintains the ram air normally passing through the heat exchanger at a minimum temperature which varies inversely with the outside air temperature.

The manually adjustable thermostat 30 having an adjustment knob 30a is provided for selection of the desired passenger compartment temperature. If the temperature is below that called for by the thermostat, the grounded bi-metal 35 will close against the contact 36 closing a circuit including lead 37, lead 26, valve coil 27, lead 28, fuse 19, power source 21 and ground. Energization of the valve coil 27 opens the water valve 29 permitting hot water to flow to the heat exchanger. Simultaneously, with the opening of the water valve, the thermostat 35 will operate to actuate fan 4 which will force more air through the heat exchanger. Thermostat 35, therefore, operates to increase the passenger compartment temperature by passing hot water to the heat exchanger and forcing more air through the heat exchanger. The fan circuit is completed as follows: from ground to bi-metal 35, contact 36, lead 37, lead 25, armature 22, contact 24, lead 38, relay coil 39, lead 40, lead 41, fuse 19, to power source 21 and ground. Energization of relay coil 39 pulls in armature 42. Thus, a circuit will be closed from ground to fan 4, contact 44, armature 42, lead 50, lead 41, fuse 19, to power source 21 and ground.

It is to be noted that relay armature 22 is normally closed against contact 24. It is pulled in only when air directed to the plenum thermostat is below 80° F. In this instance, the fan circuit cannot be closed by action of thermostat 35. Therefore, whenever the heat exchanger is cold or at least when air is directed to the plenum is below 80° F., the fan cannot be actuated.

Having thus described my invention, I claim:

1. In a heating system for the passenger compartment of a vehicle including a passageway for conveying air into the passenger compartment, a source of heated fluid, and a heat exchanger located in the air passageway and connected to the source of heated fluid, said heat exchanger having heat exchanging elements over which the air in said passageway passes and through which said heated fluid is circulated in a heat exchanging relationship with said air, said heat exchanging elements being arranged such that cool air passing over the portion of the heat exchanging elements through which the heated fluid first passes issues from the heat exchanger at a higher temperature than does air issuing from other portions of the heat exchanging elements through which the heated fluid subsequently flows; automatic control means comprising: a valve for controlling the flow of heated fluid in said heat exchanger; and a thermostat located adjacent a selected portion of said heat exchanger on the air issuing side to maintain the air issuing from said selected heat exchanger portion at a nearly constant temperature by actuating said valve which regulates the flow of heated fluid through the heat exchanger; said portion of the heat exchanger adjacent the thermostat being selected such that with a constant temperature of air issuing from said selected heat exchanger portion, the flow of heated fluid through the heat exchanger will vary inversely with the temperature of the air entering heat exchanger to cause the average temperature of all the air issuing from the heat exchanger to vary inversely with the temperature of the air entering the heat exchanger.

2. The automatic heating system of claim 1 additionally comprising: a manually adjustable thermostat responsive to the air temperature in the passenger compartment to permit adjustment of the average temperature of the air leaving the heat exchanger to a value above that determined by the thermostat adjacent the heat exchanger, said manually adjustable thermostat actuating said valve to increase the flow of heating fluid through the heat exchanger to a value greater than that determined by the thermostat adjacent the heat exchanger, and a blower controlled by said two thermostats to force air through the heat exchanger into the passenger compartment when said manually adjustable thermostat is acting to permit the flow of heated fluid but not when the thermostat adjacent the heat exchanger is also acting to permit the flow of said heated fluid.

References Cited in the file of this patent

UNITED STATES PATENTS

| | | |
|---|---|---|
| 1,665,861 | Sweatt | Apr. 10, 1928 |
| 1,948,494 | Ewald | Feb. 27, 1934 |
| 2,429,254 | Armstrong | Oct. 21, 1947 |
| 2,490,919 | Raney | Dec. 13, 1949 |
| 2,494,624 | Lehane | Jan. 17, 1950 |